(12) United States Patent
Nakamura et al.

(10) Patent No.: US 8,205,349 B2
(45) Date of Patent: Jun. 26, 2012

(54) ALIGNMENT APPARATUS AND ALIGNMENT METHOD

(75) Inventors: Akihiko Nakamura, Kawasaki (JP);
Junichi Katsuragawa, Kawasaki (JP);
Satoshi Kobari, Kawasaki (JP);
Tamotsu Sasaki, Hachiohji (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 76 days.

(21) Appl. No.: 12/818,518

(22) Filed: Jun. 18, 2010

(65) Prior Publication Data

US 2010/0319209 A1    Dec. 23, 2010

(30) Foreign Application Priority Data

Jun. 22, 2009   (JP) ................. 2009-147698

(51) Int. Cl.
*G01D 21/00*   (2006.01)
(52) U.S. Cl. .......................... 33/645; 33/613
(58) Field of Classification Search .............. 33/613, 33/645, 520, 533, 644
See application file for complete search history.

(56) References Cited

U.S. PATENT DOCUMENTS

| 7,211,168 | B2 | 5/2007 | Miyanari | |
|---|---|---|---|---|
| 7,497,026 | B2 * | 3/2009 | Herchen et al. | 33/550 |
| 2005/0173064 | A1 | 8/2005 | Miyanari | |
| 2007/0151674 | A1 | 7/2007 | Miyanari | |
| 2008/0010845 | A1 * | 1/2008 | Bailey et al. | 33/520 |
| 2008/0168673 | A1 * | 7/2008 | Herchen et al. | 33/550 |
| 2009/0064521 | A1 * | 3/2009 | Sawabe et al. | 33/645 |
| 2010/0319209 | A1 * | 12/2010 | Nakamura et al. | 33/645 |

FOREIGN PATENT DOCUMENTS

JP        2006-135272        5/2006

* cited by examiner

*Primary Examiner* — Yaritza Guadalupe-McCall
(74) *Attorney, Agent, or Firm* — Wenderoth, Lind & Ponack, L.L.P.

(57) ABSTRACT

Provided is an alignment apparatus including holding and rotating means for holding an alignment object and rotating the alignment object, the alignment apparatus including supporting means for supporting that part of the alignment object being rotated which is different from that part of the alignment object which is held by the holding and rotating means. This makes it possible to align the alignment object highly accurately by preventing the alignment object from being deformed, e.g. bent, due to its own weight.

10 Claims, 3 Drawing Sheets

ALIGNMENT APPARATUS AND ALIGNMENT METHOD

This Nonprovisional application claims priority under 35 U.S.C. §119(a) on Patent Application No. 2009-147698 filed in Japan on Jun. 22, 2009, the entire contents of which are hereby incorporated by reference.

TECHNICAL FIELD

The present invention relates to alignment apparatuses and alignment methods and, more specifically, to an alignment apparatus including rotary holding means and an alignment method that involves the use of rotary holding means.

BACKGROUND ART

In performing high-precision processing on a substrate or the like, it is useful to align (adjust the position of) the substrate or the like, which is to be processed, before the processing. For example, by aligning such a substrate as described in Patent Literature 1, onto which a dicing tape has been stuck, before dicing, the substrate can be successfully diced.

There are several types of alignment apparatus. One of them is an alignment apparatus for aligning an alignment object (e.g., a substrate) by rotating the alignment object, detecting the position of the alignment object being rotated, and moving the alignment object in accordance with a difference between a target position and the position thus detected.

The alignment apparatus is described in detail. The alignment apparatus rotates a substrate (alignment object) with a spin chuck holding a nearly central part of the substrate. Then, the alignment apparatus irradiates the substrate with light from a side facing the upper surface of the substrate and detects the light on a side facing the lower surface, thereby determining whether or not the substrate is present in the position where the substrate has been irradiated with the light. Since the substrate is being rotated, the position of the substrate as a whole can be checked by continuously irradiating the substrate with the light and detecting the light. As described above, the alignment apparatus aligns the substrate by detecting the position of the substrate and moving the alignment object in accordance with a difference between a target position and the position thus detected.

Citation List

Patent Literature 1

Japanese Patent Application Publication, Tokukai, No. 2006-135272 A (Publication Date: May 25, 2006)

SUMMARY OF INVENTION

Technical Problem

However, the alignment apparatus may decrease in alignment accuracy.

That is, the spin chuck usually holds only the nearly central part of the alignment object; therefore, a peripheral part of the alignment object may be deformed, e.g. bent, due to the alignment object's own weight. In such a case, the deformation entails a shift in position or the like of an edge portion of the alignment object. This makes the alignment apparatus unable to accurately detect the position of the substrate. Therefore, the alignment apparatus decreases in alignment accuracy.

In particular, such a substrate as described in Patent Literature 1, onto which a dicing tape has been stuck, is prone to bending in a part composed solely of the dicing tape, with the result that the problem becomes noticeable. However, no technique for suppressing such deformation has been reported at all.

The present invention has been made in view of the foregoing problems, and has as a main object to provide an alignment technique for aligning an alignment object highly accurately by preventing the alignment object from being deformed.

Solution To Problem

An alignment apparatus according to the present invention is an alignment apparatus including holding and rotating means for holding an alignment object and rotating the alignment object, the alignment apparatus including supporting means for supporting that part of the alignment object being rotated which is different from that part of the alignment object which is held by the holding and rotating means.

An alignment method according to the present invention is an alignment method including the steps of: (i) causing holding and rotating means to hold an alignment object; (ii) rotating the alignment object by rotating the holding and rotating means; (iii) detecting a position of the alignment object being rotated; and (iv) adjusting the position of the alignment object by moving the alignment object, in the step (ii), that part of the alignment object which is different from that part of the alignment object which is held by the holding and rotating means being supported by supporting means.

Advantageous Effects of Invention

The present invention suitably supports that part of an alignment object being rotated which is not held by holding and rotating means, thereby preventing that part from being deformed, e.g. bent, due to the alignment object's own weight. This makes it possible to align the alignment object highly accurately by preventing the alignment object from being deformed.

BRIEF DESCRIPTION OF DRAWINGS

FIG. 1 is a cross-sectional view schematically showing the configuration of an alignment apparatus according to an embodiment of the present invention.

FIG. 2 shows top views each schematically showing the configuration of the alignment apparatus according to the embodiment of the present invention.

FIG. 3 shows cross-sectional views each schematically explaining the movement of contact-section moving means of the alignment apparatus according to the embodiment of the present invention.

FIG. 4 is a block diagram schematically showing the function of the alignment apparatus according to the embodiment of the present invention.

DESCRIPTION OF EMBODIMENTS

First Embodiment

Figure 1:
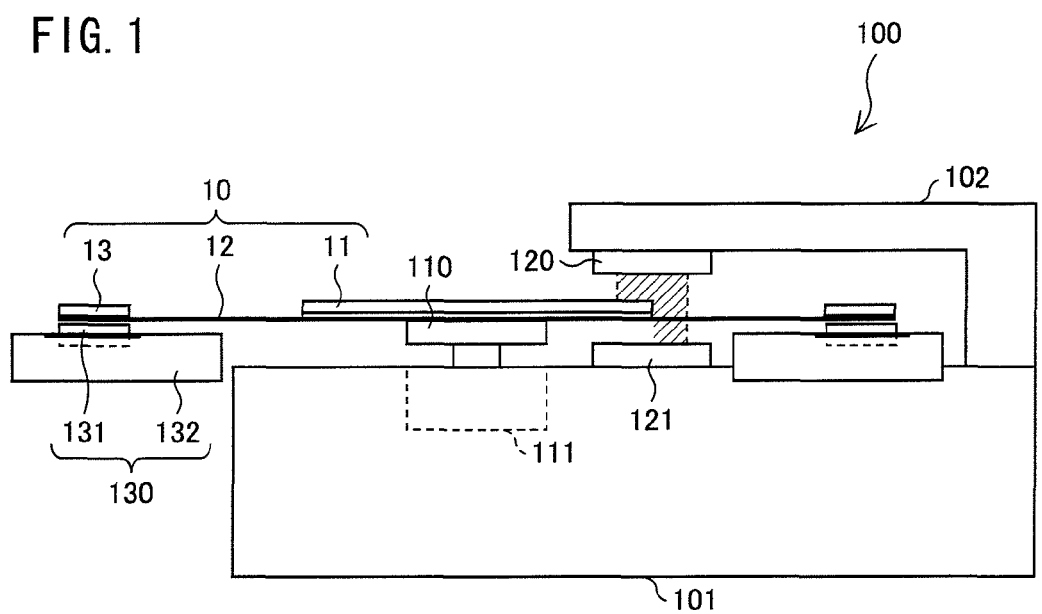
FIG. 1
Figure 2:
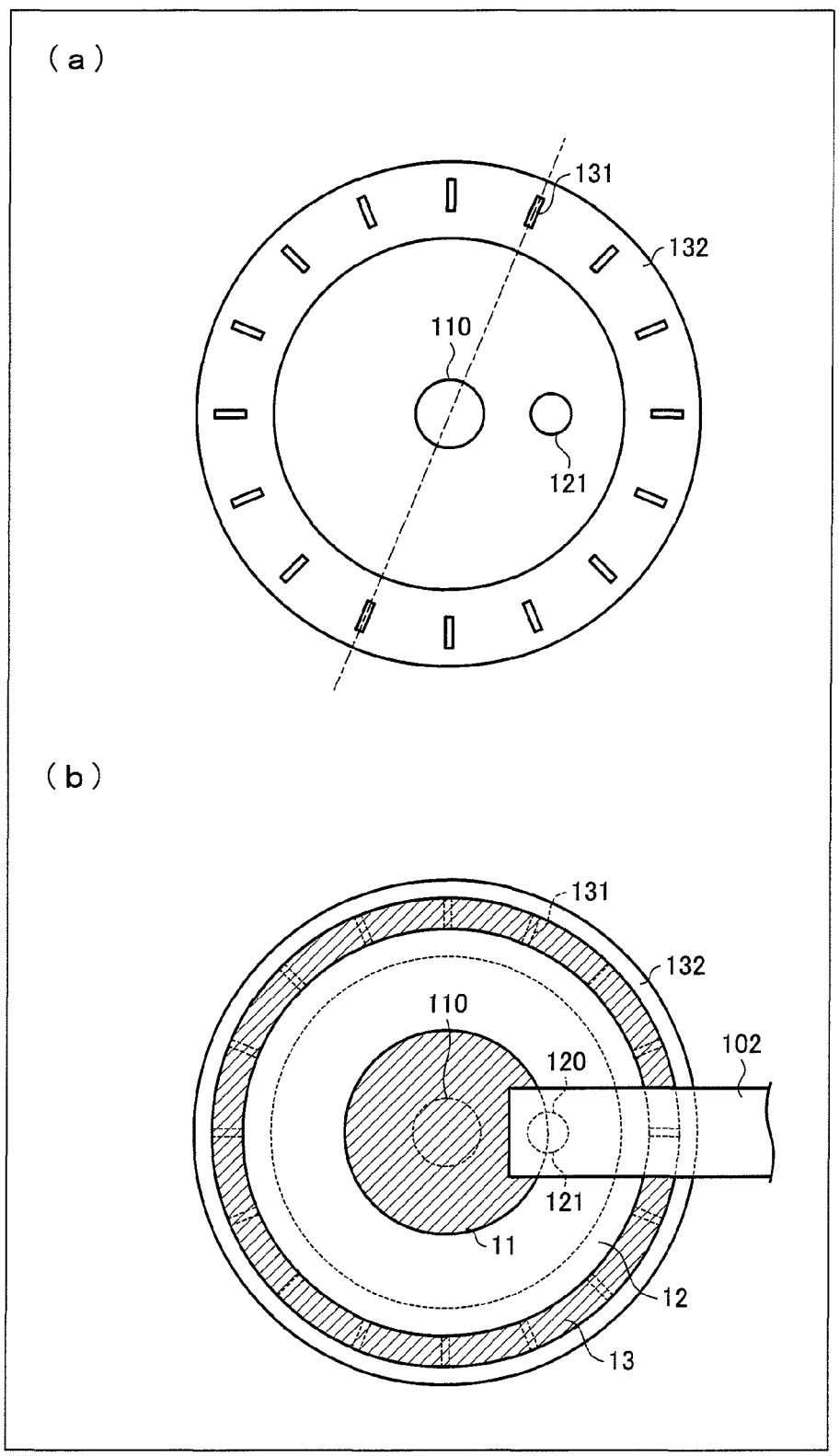
FIG. 2

An alignment apparatus according to an embodiment of the present invention is described below with reference to FIGS. 1 through 4. An alignment apparatus 100 is an apparatus that aligns (adjusts the position of) an alignment object 10. FIG. 1 is a cross-sectional view schematically showing the configuration of the alignment apparatus 100. FIG. 2 shows top views (a) and (b) each schematically showing the configuration of the alignment apparatus 100.

The top view (a) shows the alignment apparatus as seen from below the alignment object 10 (in a direction toward a spin chuck 110), and the top view (b) shows the alignment apparatus 100 as seen from further above a bridge 102.

As shown in FIG. 1, the alignment apparatus 100 has a housing 101, and the housing 101 includes the spin chuck (holding and rotating means) 110, which holds the alignment object 10 and rotates the alignment object 10.

The housing 101 is also provided with the bridge 102, which is a structure for supporting a light-projecting section 120 (light-radiating means) 120, and a light-receiving section (light-detecting means) 121. The housing 101 contains a main control section 150 (not shown) that has a position-detecting section (determining means) 156. Together with the position-detecting section 156, the light-projecting section 120 and the light-receiving section 121 constitute position-detecting means for detecting the position of the alignment object 10. The position-detecting section 156 detects the position of the alignment object 10 by sending and receiving signals to and from the light-projecting section 120 and the light-receiving section 121.

The alignment apparatus 100 further includes a supporting section (supporting means) 130 for supporting that part of the alignment object 10 being rotated which is different from that part of the alignment object 10 which is held by the spin chuck 110. Since the alignment apparatus 100 includes such a supporting section 130, the alignment apparatus 100 can support that part of the alignment object 10 being rotated which is not held by the spin chuck 110, thereby preventing that part of the alignment object 10 from being deformed, e.g. bent, due to the alignment object's own weight. This enables the alignment apparatus 100 to align the alignment object 10 highly accurately by preventing the alignment object 10 from being deformed to cause degradation in accuracy of detection of the position of the alignment object 10.

In particular, it is preferable that, as shown in FIGS. 1 and 2, the supporting section 130 support a peripheral part (located farther away from the center of rotation than that part of the alignment object 10 which is held by the spin chuck 110) of the alignment object 10 from below. This enables the alignment apparatus 100 to align the alignment object highly accurately by supporting the peripheral part, which is prone to bending, of the alignment object 10 and thereby preventing the peripheral part from being deformed.

(Alignment Object)

The alignment object 10 according to the present embodiment is constituted by a substrate 11 being stuck onto a dicing tape (film) 12 that is larger than the substrate 11, with the substrate 11 stuck onto a central part of the dicing tape 12. Further, the dicing tape 12 is retained by a dicing frame 13 that serves as an outer frame (see FIG. 1 and (b) of FIG. 2).

Further, it is preferable that the substrate 11 have a mark such as an orientation flat or a notch provided in one place in its outer edge portion so that an angle of rotation can be adjusted during alignment.

The alignment object 10 to be processed by the alignment apparatus 100 is not limited to that described above, provided it is an object to be aligned. Examples of the alignment object 10 include a metal or nonmetal substrate, a metal or nonmetal support plate that is stuck onto a substrate, a film such as a dicing tape or a masking tape, and a combination of thereof.

(Spin Chuck)

The spin chuck 110 only needs to be able to hold the alignment object 10 by vacuuming through a mechanism such as a vacuum pump and rotate the alignment object 10, which is being held, in an in-plane direction on its holding surface. For example, the spin chuck 110 may be a spin chuck constituted by an ordinary vacuum chuck and an ordinary motor. In this specification, the term "hold . . . by vacuuming" means holding an object with a difference in barometric pressure from the surroundings by depressurizing a contact section that makes contact with the object; however, the contact section (or a space formed by the object and the contact section) does not necessarily need to be in a so-called vacuum state. Further, "hold . . . by vacuuming" is sometimes referred to simply as "vacuuming".

The volume of air that is displaced by the spin chuck 110 and the like only needs to be selected appropriately according to the size of the alignment object 10 and the like. Further, that contact surface (holding surface) of the spin chuck 110 which makes contact with the alignment object 10 may be provided with grooves for vacuuming, and the contact surface may be composed of a porous substance. Further, the speed at which the spin chuck 110 turns is not limited, provided the alignment object 10 can be successfully aligned. The speed can range from 2 rpm or higher to 50 rpm or lower. For example, the speed can be approximately 10 rpm.

Further, the alignment apparatus 100 includes a spin-chuck position-adjusting section 111 for moving the spin chuck 110 in an in-plane direction on the holding surface. The alignment apparatus 100 aligns the alignment object 10 to a target position by causing the spin-chuck position-adjusting section 111 to move the spin chuck 110 in accordance with the position of the alignment object 10 as detected by the position-detecting means, which is mentioned below.

(Supporting Section)

The supporting section 130 serves to support that part of the alignment object 10 being rotated which is different from that part of the alignment object 10 which is held by the spin chuck 110. In this specification, "supporting a part of an object" means "applying, to the part of the object, force having a vector component in a direction opposite to the direction of gravitational force.

It is preferable that such a supporting section 130 include a contact section that makes contact with that part of the alignment object 10 which is different from that part of the alignment object 10 which is held by the spin chuck 110, for example, and that a direction from the contact section to the alignment object 10 be opposite to the direction of gravitational force. In this way, the supporting section 130 can apply, to that part of the alignment object 10 which is not held by the spin chuck 110, force having a vector component in a direction opposite to the direction of gravitational force, and therefore can prevent that part from being deformed, e.g. bent, due to the alignment object's own weight.

Although the contact section is not particularly limited in shape or material, it is preferable that the contact section not hinder the rotation of the alignment object 10. That is, it is preferable that the contact section include rotation-assisting means for assisting the spin chuck 110 in rotating the alignment object 10. In the present embodiment, the rotation-assisting means is rollers (bodies of rotation) 131 that make contact with the alignment object 10 and roll over along with the rotation of the alignment object 10. Other usable examples of the rotation-assisting means include low-friction materials such as aluminum, stainless steel, and synthetic resin.

Since the rollers 131 roll over along with the rotation of the alignment object 10 while making contact with the alignment object 10, the rollers 131 can reduce the frictional force that hinders the rotation of the alignment object 10, while supporting the alignment object 10. That is, by including the rollers 131, the supporting section 130 can support the alignment object 10 without hindering the rotation of the alignment object 10.

It is preferable that each of the rollers 131 rotates on an axis of rotation represented by a straight line (e.g., a dashed line in (a) of FIG. 2) orthogonal to the axis of rotation of the spin chuck 110. This allows the rollers 131 to rotate smoothly along with the rotation of the alignment object 10, and the rollers 131 will not hinder the rotation of the alignment object 10.

Further, the supporting section 130 may include, instead of the contact section, an air bearing structure that supplies a gas into a space between the alignment object 10 and the supporting section 130 and applies, to the alignment object 10, air pressure having a vector component in a direction opposite to the direction of gravitational force. Even when so configured, the supporting section 130 can apply, to that part of the alignment object 10 which is not held by the spin chuck 110, force having a vector component in a direction opposite to the direction of gravitational force, and therefore can prevent that part from being deformed, e.g. bent, due to the alignment object's own weight.

That part of the alignment object 10 which is supported by the supporting section 130 is not particularly limited, provided the part is different from that part of the alignment object 10 which is held by the spin chuck 110. However, it is preferable that, as shown in (b) of FIG. 2, the part be farther away from the center of rotation than that part of the alignment object 10 which is held by the spin chuck 110. Because the spin chuck 110 usually holds a central part of the alignment object 10, the peripheral part of the alignment object 10, i.e. that part of the alignment object 10 which is farther away from the center of rotation than that of the alignment object 10 which is held by the spin chuck 110, is prone to deformation or the like due to the alignment object's own weight. Therefore, by supporting the peripheral part of the alignment object 10, the supporting section 130 can suitably prevent the alignment object 10 from being deformed.

In particular, when an alignment object 10 constituted by a substrate 11 being stuck onto a dicing tape 12 that is larger than the substrate 11 is supported as in the present embodiment, it is preferable that, as shown in (b) of FIG. 2, the supporting section 130 support at least that part of the dicing tape 12 onto which the substrate 11 has not been stuck. This makes it possible to support the dicing tape 12, which is soft and prone to deformation, and thereby successfully prevent the alignment object 10 from being deformed.

In the present embodiment, as shown in (a) and (b) of FIG. 2, the rollers 131 are located within the dicing frame 13 so as to evenly support the alignment object 10. This makes it possible to suitably support the alignment object 10.

It is preferable that the supporting section 130 further include a lifting and lowering stage (contact-section moving means) 132 for moving the contact section (or the rollers 131 of the present embodiment), which makes contact with the alignment object 10, so that the contact section is moved into contact with or away from the alignment object 10. In the present embodiment, the rollers 131, provided on the lifting and lowering stage 132, are moved upward or downward, i.e. moved into contact with or away from the alignment object 10, as the lifting and lowering stage 132 moves upward or downward. The lifting and lowering stage 132 can be constituted, for example, by an ordinary electric stage or the like.

Figure 3:
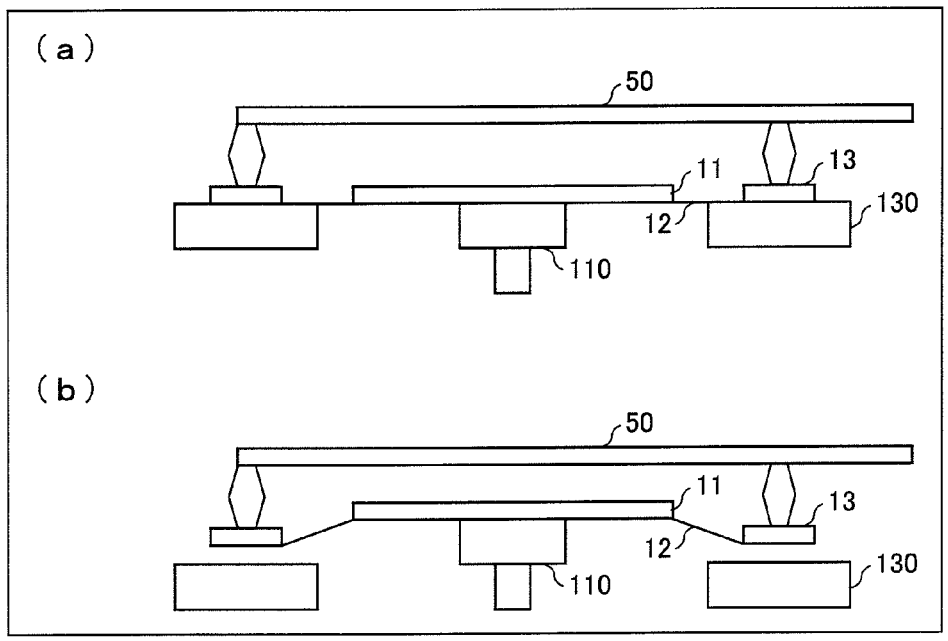
FIG. 3

FIG. 3 shows cross-sectional view each schematically explaining the movement of the lifting and lowering stage 132. The advantages of the lifting and lowering stage 132 are described with reference to FIG. 3.

The alignment object 10 is conveyed to the alignment apparatus 100, for example, by using a robot arm 50. The robot arm 50 uses a sucker or the like to retain a part of the dicing frame 13 at the edge of the alignment object 10 and conveys the alignment object 10 from a preprocessing apparatus to the alignment apparatus 100.

It should be noted here that when the surface where the spin chuck 110 and the alignment object 10 touch each other and the surface where the supporting section 130 and the alignment object 10 touch each other are flush with each other (at exactly the same level) as shown in (a) of FIG. 3, a deformation, e.g. a bend, in (the dicing tape 12 of) the alignment object 10 may prevent (a part of) the alignment object 10 (overlapped with the substrate 11) from being smoothly placed onto the spin chuck 110. In such a case, the alignment object 10 cannot be successfully held by the spin chuck 110.

On the other hand, when the lifting and lowering stage 132 has moved the rollers 131 away from the alignment object 10 before the conveyance of the alignment object 10 as shown in (b) of FIG. 3, even a deformation, e.g. a bend, in (the dicing tape 12 of) the alignment object 10 will not prevent (a part of) the alignment object 10 (overlapped with the substrate 11) from being smoothly placed onto the spin chuck 110, with the result that the alignment object 10 can be successfully held by the spin chuck 110.

By the lifting and lowering stage 132 thus moving the rollers 131 into contact with or away from the alignment object 10, the alignment object 10 can be successfully conveyed into the alignment apparatus 100.

It is preferable that when the alignment object 10 is conveyed into the alignment apparatus 100 and the spin chuck 110 holds the alignment object 10 and rotates the alignment object 10, the lifting and lowering stage 32 move the rollers 131 so that the surface where the spin chuck 110 and the alignment object 10 touch each other and the surface where the supporting section 130 and the alignment object 10 touch each other are flush with each other (at exactly the same level) as shown in FIG. 1.

(Position-detecting Means)

As mentioned above, the position-detecting means, which detects the position of the alignment object 10, is constituted by including the light-projecting section 120, the light-receiving section 121, and the position-detecting section 156. The light-projecting section 120, provided on the bridge 102, irradiates the alignment object 10 with light from above. The light-receiving section 121, provided on the housing 101, receives the light radiated from the light-projecting section 120.

In the present embodiment, the light-projecting section 120 passes light through that region of the alignment object 10 which covers an edge portion of the substrate 11. This light is detected by the light-receiving section 121, whereby the light-receiving section 121 can discover how much the center of rotation of the substrate 11, i.e. the center of rotation of the alignment object 10, is out of alignment with the center of the alignment object 10 or the center of the substrate 11.

For example, a person skilled in the art would be able to easily understand that the duration of passage of the substrate 11 through a space between the light-projecting section 120 and the light-receiving section 121 in (b) of FIG. 2 can be expressed as a function of distance from the center of rotation of the substrate 11.

Alternatively, when in another embodiment the center of the alignment object 10 is out of alignment with the center of rotation, that region of the substrate 11 which blocks the light radiated by the light-projecting section 120 changes according to the rotation; therefore, the light that is received by the light-receiving section 121 also changes in shape. The position-detecting section 156 may detect the position of the alignment object 10 by calculating misalignment of the center of the alignment object 10 with the center of rotation in accordance with a change in shape of the light that is received by the light-receiving section 121.

Further, it is preferable that the light-receiving section 121 detect the angle of the alignment object 10 by detecting an angle-detecting mark such as an orientation flat provided on the substrate 11 as mentioned above.

As described above, the position-detecting means can detect the misalignment of the center of the alignment object 10 with the center of rotation (i.e., the center of rotation of the spin chuck 110) and the angle of rotation. Therefore, the position-detecting means can detect the position of the alignment object.

(Outline of the Operation of the Alignment Apparatus)

Figure 4:
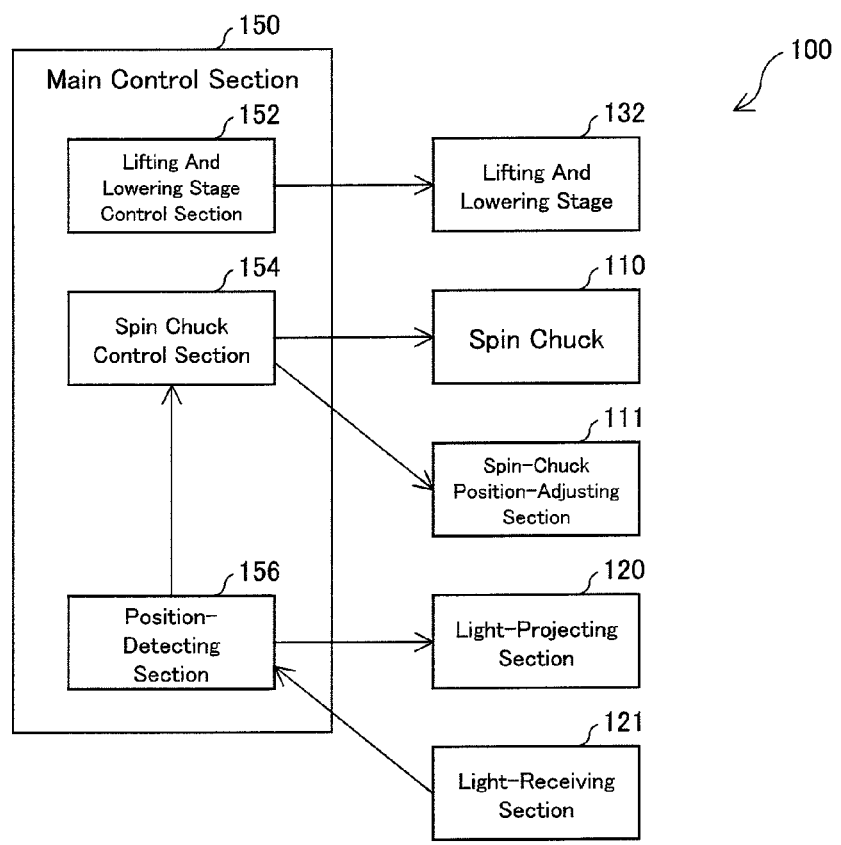
FIG. 4

The following schematically explains the operation of the alignment apparatus 100. FIG. 4 is a block diagram schematically showing the function of the alignment apparatus 100. As shown in FIG. 4, the main control section 150 of the alignment apparatus 100 includes a lifting and lowering stage control section 152, a spin chuck control section 154, and the position-detecting section (determining means) 156.

First, when the alignment object 10 is conveyed into the alignment apparatus 100, the lifting and lowering stage control section 152 moves the lifting and lowering stage 132 to a position shown in (b) of FIG. 3. Then, the apparatus for conveying the alignment object 10, e.g. the robot arm 50, conveys the alignment object 10 in such a manner that the substrate 11 is placed on the spin chuck 110. On completion of the conveyance of the alignment object 10, the lifting and lowering stage control section 152 moves the lifting and lowering stage 132 so that the spin chuck 110 and the supporting section 130 touch the alignment object 10 in one plane.

Then, the spin chuck control section 154 causes the spin chuck 110 to hold the alignment object 10 and rotate the alignment object 10. The (rollers 131 of the) supporting section 130 support(s) the peripheral part of the alignment object 10, thereby preventing the alignment object 10 from being deformed.

The subsequent operations can be carried out in the same manner as those which are carried out by an ordinary alignment apparatus. That is, the position-detecting section 156 causes light to be radiated from the light-projecting section 120. The light-receiving section 121 detects the light, radiated from the light-projecting section 120, which has been blocked or has not been blocked by the substrate 11. The position-detecting section 156 obtains a result of detection by the light-receiving section 121, and then calculates the position of the alignment object 10 in accordance with the detection result. Furthermore, the position-detecting section 156 calculates a difference between the position of the alignment object 10 thus calculated and a target alignment position inputted in advance to the main control section 150, and then sends the spin chuck control section 154 information indicative of the difference. The spin chuck control section 154 controls the spin chuck 110 and the spin-chuck position-adjusting section 111 so that the difference is eliminated. Thus, the alignment apparatus 100 can align the alignment object 10.

(Modification)

When the main control section 150 has inputted in advance thereto information indicative of the color of the alignment object 10 (esp., the color of the dicing tape 12, which transmits light), the position-detecting section 156 may detect the position of the alignment object 10 in accordance with the result of detection of light by the light-receiving section 121 and the information indicative of the color of the alignment object 10 as inputted in advance.

That is, the result of detection of light by the light-receiving section 121 is affected by the color of the dicing tape 12, through which the light is allowed to travel. The position-detecting section 156 in this modification detects the position of the alignment object 10 in consideration of the color of the dicing tape 12, and therefore can detect the position more accurately. Particularly, for example, the position-detecting section 156 may correct the result of detection by the light-receiving section 120 by using a correction coefficient corresponding to the color of the dicing tape 12 and then calculate the position of the alignment object 10 from the result of detection by the light-receiving section 120 thus corrected. The correction coefficient corresponding to the color of the dicing tape 12 can be obtained, for example, by finding optimum values experimentally, associating them with possible colors of the dicing tape 12, prestoring the values and colors as a table in the main control section 150, and causing the position-detecting section 156 to refer to the table.

Further, the position-detecting section 156 may control, in accordance with the information indicative of the color of the alignment object 10 as inputted in advance, the wavelength of light that is radiated by the light-projecting section 120. This enables the position-detecting section 156 to detect the position of the alignment object 10 more accurately. The wavelength of light that the light-projecting section 120 is supposed to radiate is obtained, for example, by finding optimum values experimentally, associating them with possible colors of the dicing tape 12, prestoring the values and colors as a table in the main control section 150, and causing the position-detecting section 156 to refer to the table.

The main control section 150 of the alignment apparatus 100 may be constituted by hardware logic or realized by software as executed by a CPU (central processing unit) as follows:

That is, the main control section 150 includes: a CPU, such as an MPU, which executes instructions from a program that realizes the functions; and storage devices (storage media) such as a ROM (read only memory) containing the program, a RAM (random access memory) to which the program is loaded, and a memory containing the program and various types of data.

The object of the present invention can also be achieved not only by storing the program fixedly in the program memory of the main control section 150, but also by providing the apparatus with a storage medium containing a program code (executable program, intermediate code program, or source program) for the program so that the apparatus retrieves and executes the program code contained in the storage medium.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be used, for example, in the field of manufacture of machines for processing substrates.

REFERENCE SIGNS LIST

10 Alignment object
11 Substrate
12 Dicing tape (film)
13 Dicing frame
50 Robot arm
100 Alignment apparatus
101 Housing
102 Bridge
110 Spin chuck (holding and rotating means)
111 Spin-chuck position-adjusting means
120 Light-projecting section (light-radiating means)
121 Light-receiving section (light-detecting means)
130 Supporting section (supporting means)
131 Roller (rotation-assisting means)
132 Lifting and lowering stage (contact-section moving means)
150 Main control section
152 Lifting and lowering stage control section
154 Spin chuck control section
156 Position-detecting section (determining means)

The invention claimed is:

1. An alignment apparatus comprising:
holding and rotating means for holding an alignment object and rotating the alignment object; and
supporting means for supporting that part of the alignment object being rotated which is different from that part of the alignment object which is held by the holding and rotating means.

2. The alignment apparatus as set forth in claim 1, wherein the supporting means supports that part of the alignment object which is farther away from a center of rotation than that part of the alignment object which is held by the holding and rotating means.

3. The alignment apparatus as set forth in claim 1, wherein the supporting means includes:
a contact section that makes contact with the alignment object being rotated; and
contact-section moving means for moving the contact section into contact with or away from the alignment object.

4. The alignment apparatus as set forth in claim 3, wherein the contact section includes rotation-assisting means for assisting the alignment object in being rotated as the holding and rotating means rotates.

5. The alignment apparatus as set forth in claim 4, wherein the rotation-assisting means is a body of rotation that makes contact with the alignment object and rolls over itself as the object is rotated.

6. The alignment apparatus as set forth in claim 5, wherein the body of rotation rotates on an axis of rotation orthogonal to an axis of rotation of the holding and rotating means.

7. The alignment apparatus as set forth in claim 1, wherein:
the alignment object is constituted by a substrate being stuck onto a film that is larger than the substrate; and
the supporting means supports at least that part of the film onto which the substrate has not been stuck.

8. The alignment apparatus as set forth in claim 1, further comprising position-detecting means for detecting a position of the alignment object.

9. An alignment method comprising the steps of:
(i) causing holding and rotating means to hold an alignment object;
(ii) rotating the alignment object by rotating the holding and rotating means;
(iii) detecting a position of the alignment object being rotated; and
(iv) adjusting the position of the alignment object by moving the alignment object,
in the step (ii), that part of the alignment object which is different from that part of the alignment object which is held by the holding and rotating means being supported by supporting means.

10. An alignment apparatus comprising:
holding and rotating means for holding an alignment object and rotating the alignment object; and
position-detecting means for detecting a position of the alignment object,
the position-detecting means comprising:
light-radiating means for irradiating light with the alignment object;
light-detecting means for detecting light passed through the alignment object; and
determining means for determining the position of the alignment object from a result of detection by the light-detecting means and information indicative of a color of the alignment object as inputted in advance.

* * * * *